US008408511B2

(12) United States Patent
Semenchenko

(10) Patent No.: US 8,408,511 B2
(45) Date of Patent: Apr. 2, 2013

(54) ACTUATING LEVER FOR A LONGITUDINAL ADJUSTMENT DEVICE OF A MOTOR VEHICLE SEAT

(75) Inventor: Valerii Semenchenko, Hochheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 12/634,565

(22) Filed: Dec. 9, 2009

(65) Prior Publication Data

US 2010/0140438 A1 Jun. 10, 2010

(30) Foreign Application Priority Data

Dec. 9, 2008 (DE) .......................... 10 2008 061 109

(51) Int. Cl.
*F16M 13/00* (2006.01)
(52) U.S. Cl. .................. 248/424; 297/344.11; 296/65.15
(58) Field of Classification Search .................. 248/419, 248/424, 429, 430, 425; 297/344.11; 16/423, 16/444; 296/65.13, 65.14, 65.15, 65.12, 296/65.07
See application file for complete search history.

(56) References Cited

U.S. PATENT DOCUMENTS

| 3,257,100 | A | * | 6/1966 | Helders | 254/132 |
|---|---|---|---|---|---|
| 3,866,876 | A | * | 2/1975 | Adams | 248/429 |
| 4,568,054 | A | * | 2/1986 | Degremont | 248/429 |
| 4,881,774 | A | * | 11/1989 | Bradley et al. | 297/341 |
| 4,957,255 | A | * | 9/1990 | John | 248/220.21 |
| 5,100,092 | A | * | 3/1992 | Sovis | 248/429 |
| 5,344,114 | A | | 9/1994 | Rees | |
| 5,461,755 | A | * | 10/1995 | Hardigg et al. | 16/438 |
| 5,533,421 | A | * | 7/1996 | Damerow et al. | 74/563 |
| 5,568,908 | A | * | 10/1996 | Kisiel | 248/419 |
| 5,737,842 | A | * | 4/1998 | Freedman | 30/280 |
| 5,741,000 | A | * | 4/1998 | Goodbred | 248/430 |
| 5,775,662 | A | * | 7/1998 | Hoshihara et al. | 248/429 |
| 5,785,291 | A | * | 7/1998 | Chang | 248/429 |
| 5,842,383 | A | * | 12/1998 | Yamada et al. | 74/528 |
| 5,941,494 | A | * | 8/1999 | Garrido | 248/429 |
| 6,036,157 | A | * | 3/2000 | Baroin et al. | 248/429 |
| 6,036,267 | A | * | 3/2000 | Downey et al. | 297/341 |
| 6,041,474 | A | * | 3/2000 | Bucher | 16/110.1 |
| 6,098,946 | A | * | 8/2000 | Sechet et al. | 248/424 |

(Continued)

FOREIGN PATENT DOCUMENTS

DE 69204534 T2 2/1996
DE 69411560 T2 4/1999

(Continued)

OTHER PUBLICATIONS

British Patent Office, British Search Report for British Application No. GB0920658.2, Mar. 3, 2010.

(Continued)

*Primary Examiner* — Nkeisha Smith
(74) *Attorney, Agent, or Firm* — Ingrassia Fisher & Lorenz, P.C.

(57) ABSTRACT

An actuation lever according is provided for a longitudinal adjustment device of a car seat, and includes, but is not limited to a gripping section, which a person uses to grab the actuation lever, and at least one attachment section for mechanically coupling the lever with a locking unit of the longitudinal adjustment device. The actuation lever is at least section ally, but preferably completely, made out of an injection molded plastic part.

17 Claims, 4 Drawing Sheets

U.S. PATENT DOCUMENTS

| | | | | |
|---|---|---|---|---|
| 6,176,460 | B1 * | 1/2001 | Kojima et al. | 248/429 |
| 6,318,696 | B1 * | 11/2001 | Downey et al. | 248/430 |
| 6,631,879 | B2 * | 10/2003 | Hibino et al. | 248/429 |
| 6,681,910 | B1 | 1/2004 | Schumann et al. | |
| 6,772,985 | B2 * | 8/2004 | Lee | 248/424 |
| 6,902,235 | B2 * | 6/2005 | Rohee et al. | 297/334 |
| 6,923,415 | B2 * | 8/2005 | Yokoi et al. | 248/424 |
| 7,150,441 | B2 * | 12/2006 | Leguede et al. | 248/423 |
| 7,296,494 | B2 * | 11/2007 | Caba et al. | 74/513 |
| 7,380,763 | B2 * | 6/2008 | Sakamoto | 248/422 |
| 7,594,634 | B2 | 9/2009 | Garotte et al. | |
| 7,669,825 | B2 * | 3/2010 | Sung | 248/429 |
| 7,717,392 | B2 * | 5/2010 | Sakakibara et al. | 248/429 |
| 7,798,462 | B2 * | 9/2010 | Yoshida et al. | 248/429 |
| 7,922,143 | B2 * | 4/2011 | Park et al. | 248/429 |
| 2002/0060281 | A1 * | 5/2002 | Okazaki et al. | 248/424 |
| 2003/0085330 | A1 * | 5/2003 | Lee | 248/430 |
| 2004/0149069 | A1 * | 8/2004 | Caba et al. | 74/513 |
| 2006/0261236 | A1 * | 11/2006 | Weber et al. | 248/424 |
| 2007/0090262 | A1 * | 4/2007 | Sung | 248/429 |
| 2009/0085367 | A1 | 4/2009 | Downey | |
| 2010/0243852 | A1 * | 9/2010 | Muraishi | 248/429 |
| 2011/0121154 | A1 * | 5/2011 | Kimura et al. | 248/429 |
| 2011/0163217 | A1 * | 7/2011 | Kimura et al. | 248/429 |

FOREIGN PATENT DOCUMENTS

| | | |
|---|---|---|
| DE | 20318787 U1 | 4/2005 |
| DE | 102006013492 A1 | 10/2006 |
| DE | 102005019765 A1 | 11/2006 |
| DE | 202007001394 U1 | 6/2008 |
| EP | 1424029 A1 | 6/2004 |
| FR | 2894891 A1 | 6/2007 |

OTHER PUBLICATIONS

German Patent Office, German Search Report for Application No. 102008061109.3, dated Jun. 9, 2009.

British Patent Office, British Search Report for Application No. 0920658.2, dated Mar. 3, 2010.

* cited by examiner

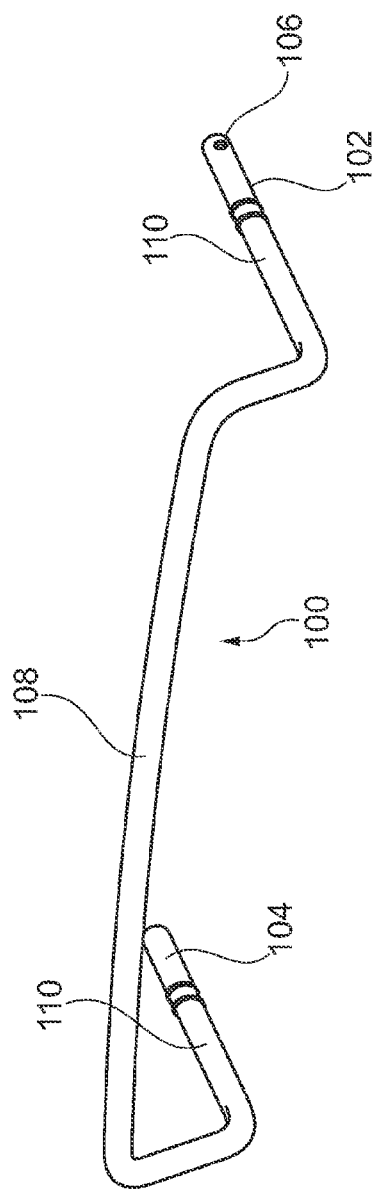
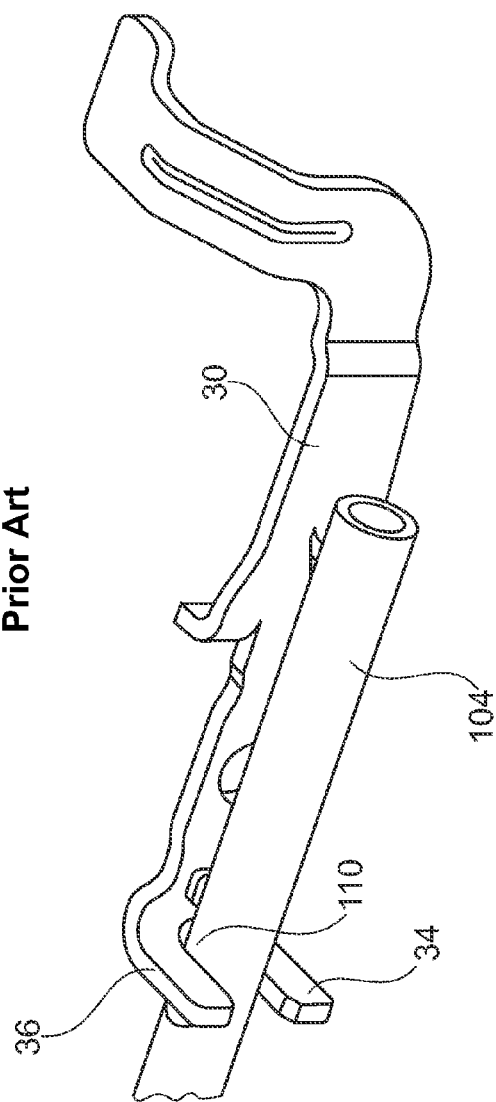
Fig. 1
Prior Art
Fig. 2
Prior Art

ACTUATING LEVER FOR A LONGITUDINAL ADJUSTMENT DEVICE OF A MOTOR VEHICLE SEAT

CROSS-REFERENCE TO RELATED APPLICATION

This application claims priority to German Patent Application No. 102008061109.3, filed Dec. 9, 2008, which is incorporated herein by reference in its entirety.

TECHNICAL FIELD

The present invention relates to an actuating lever for a longitudinal adjustment device of a motor vehicle, as well as to a corresponding longitudinal adjustment device, in particular for adjusting the position of the front seats in motor vehicles in the longitudinal direction of the vehicle.

BACKGROUND

Longitudinal adjustment devices are provided in nearly every motor vehicle, in particular for the front seats of passenger cars. The latter most often exhibit an upper rail connected with the car seat and a lower rail arranged on the vehicle body. When adjusting the car seat in the longitudinal direction of the vehicle, the upper rail on the seat side shifts relative to the lower rail.

The vehicle seat is kept in a predetermined position by means of a locking device, which prevents the upper rail and lower rail from shifting relative to each other.

In order to shift or adjust the vehicle seat in the longitudinal direction of the vehicle, it is provided that the locking device at least periodically allows a shifting of the upper rail and lower rail. To this end, a longitudinal adjustment typically exhibits an actuating lever that can be actuated by a vehicle passenger. Such actuation levers are typically situated under the vehicle seat, and can be gripped and actuated from the front by the vehicle passengers.

In particular by swiveling, but also by shifting the actuation lever, the lock between the upper rail and lower rail of the longitudinal adjustment device can be periodically released, thereby making it possible to shift the seat in the longitudinal direction of the vehicle.

The actuation levers previously used in prior art are made of a metal material, in particular a bent metal bracket, which is stiff enough to transfer the forces applied by the vehicle passengers to the locking device.

For example, FIG. 1 shows an example of such a metal bracket of the kind used in prior art. The actuation lever 100 made entirely of metal exhibits a bracket-like geometry overall, with a gripping section 108 and two attachment sections 102, 104 provided at both of its ends. To establish an attachment to the longitudinal adjustment device or its locking device, both free ends of the actuation lever 100 exhibit an outer depression or receptacle 106 for a corresponding projection (not explicitly shown) of one locking unit 30 of the locking device.

Further, a respective depression or notch 110 is provided in proximity to the attachment sections 102, 104, which comes to lie against the locking unit 30 between two fork-shaped attachment lugs 34, 36 with the actuation lever 100 assembled as shown on FIG. 2.

Such an actuation lever 100 does satisfy the prescribed mechanical load requirements. However, it is comparatively expensive to manufacture such actuation levers 100 made completely of metal. In addition, users perceive the haptic properties of such a metal bracket 100 as unpleasant owing to the often smooth and cold surface.

In view of the foregoing, at least one object of the invention is to provide an actuation lever for a longitudinal adjustment device of a car seat that can be produced more cost effectively and is easier to mount on a vehicle seat or its longitudinal adjustment device. In addition, the actuation lever is to exhibit haptic properties that are tangibly more pleasant to the user by comparison to an actuation lever made entirely of metal. In addition, other objects, desirable features, and characteristics will become apparent from the subsequent summary and detailed description, and the appended claims, taken in conjunction with the accompanying drawings and this background.

SUMMARY

The at least one object, and other objects, desirable features and characteristics, is achieved with an actuation lever as well as a longitudinal adjustment device, and a vehicle seat.

The actuation lever according to an embodiment of the invention is provided for a longitudinal adjustment device of a car seat, and exhibits at least one gripping section, which a person uses to grab the lever. In addition, the actuation lever exhibits at least one attachment section for mechanically coupling the lever with a locking unit of the longitudinal adjustment device. The attachment section or gripping section is designed as an injection molded plastic part.

Designing at least portions of the actuation lever as an injection molded plastic part in this way makes it possible to correspondingly reject the use of metal material. This is accompanied by a savings in weight, along with a reduction in cost during the manufacture of the actuation lever.

The actuation lever designed only in portions as an injection molded plastic part can also easily satisfy all mechanical load requirements by continuing to fabricate precisely those sections of the actuation lever exposed to a correspondingly high load during actuation out of metal.

A first advantageous embodiment of the invention provides that both the gripping section and attachment section of the actuation lever be designed as an injection molded plastic part. Designing the gripping section as an injection molded plastic part makes it possible to provide haptics that are more pleasurable to the user by comparison to a metal lever. The outer shape of the gripping section can also be optimized to provide a pleasant and reliable gripping action, for example by furnishing a recessed grip.

Another especially advantageous embodiment of the invention provides that the entire actuation lever be designed as a one-part injection molded plastic part. This makes it possible to entirely forego the use of metal materials in manufacturing the actuation lever. The advantages relative to cost and weight savings are obvious. In addition, the plastic injection molding process establishes and sets the outer shape of the actuation level from the outset. As opposed to a using a metal pipe as the initial work piece, the component need not be subjected to any forming operations to achieve its prescribed outer shape.

In a further development of the invention, it is further provided that the injection molded plastic parts or entire actuation lever being designed as components that can be fabricated in an internal gas pressure injection molding process. During internal gas pressure injection molding, a gas is injected under a high pressure after the injection molding tool filling phase, in particular after reaching a predetermined partial filling of the cavity formed by the tool. The gas expels the free-flowing plastic, and fills the remainder of the tool cavity at pressures that can measure several 100 bar.

This expulsion produces hollow spaces in the injection molded component. The internal gas pressure injection molding process makes it possible to fabricate partially or entirely thick-walled injection molded parts that are devoid of sink marks and exhibit a sufficient surface quality. Shorter cycle times are achieve din the process, and material consumption is also reduced. In addition, the targeted formation of hollow spaces increases the stiffness of the injection molded part, and components of nearly any complexity can be generated in an especially streamlined manufacturing process.

As an alternative to the internal gas pressure process, it is further conceivable to manufacture the actuation lever using an internal water pressure injection molding process.

In a further embodiment of the invention, at least the gripping section of the actuation lever is provided with a hollow section in cross section. In addition, the attachment section can also exhibit an internal hollow space. Individual sections or the entire actuation lever can also be designed as a single or multi-component injection molded part.

The use of different plastics, preferably thermoplastics, duroplastics or elastomers, makes it possible to target prescribed stiffness and load requirements.

Another advantageous embodiment of the invention provides that at least the attachment section is fiber reinforced. The actuation lever here exhibits a fiber-reinforced plastic at least in its attachment section, but possibly also in its grip and any interspersed sections. Fiber-reinforcing materials include in particular fiberglass. Use can also be made in particular of materials like PA66-GF30 as the fiber-reinforced polyamide, at least in the attachment section.

One advantageous further development of the invention provides that at least the attachment section exhibits reinforcement ribs, which run inclined relative to the longitudinal extension of the attachment section. Such reinforcement or stiffening ribs increase the structural rigidity at least of the attachment section, so that the actuation lever made completely out of plastic can withstand the forces arising when actuating the lever.

It is here provided in particular that the reinforcement ribs form triangular or polygonal, in particular hexagonal, hollow spaces in cross section, possibly with one or two opposing exterior walls of the attachment section, wherein the hollow spaces extend essentially parallel to the swiveling movement of the actuation lever. The formation of triangular or hexagonal hollow spaces preferably extending perpendicular to the longitudinal extension of the attachment section can already provide sufficient structural stiffness owing to the shape of the attachment section, which can naturally be clearly increased even more through the use of fiber-reinforced plastics.

Another preferred embodiment of the invention provides that the attachment section exhibits at least two positive-fit elements spaced radially apart relative to a swiveling axis of the lever, which with the lever assembled on the longitudinal adjustment device interact with corresponding positive-fit elements of the locking unit to form a positive connection between the actuation lever and longitudinal adjustment device. The positive-fit elements provided for securing the actuation lever make it possible to attach the lever without using separate attachment means provided for this purpose, potentially even without the use of any tools.

For example, it is provided that the attachment section exhibits at least two receptacles spaced radially apart from each other for holding corresponding journals or brackets of the locking unit. The receptacles provided on the attachment section preferably extend perpendicular to the longitudinal extension of a leg of the actuation lever passing over into the attachment section. For example, it can be provided in particular that the receptacle and journals or brackets on the locking unit side that correspond therewith essentially extend in the transverse direction of the vehicle.

Providing at least two spaced-apart receptacles on the attachment section of the actuation lever is by no means compulsory. The present embodiments of the invention also allows for the reverse arrangement of corresponding positive-fit means, for example in the form of journals or brackets on the actuation lever side along with receptacles on the locking unit that correspond therewith.

It is additionally provided that the attachment section exhibits at least one flexible or elastically deformable or elastically deployable latching element, which at least sectionally grips an edge or hole border of the locking unit on the locking device with the actuation lever assembled. The latching element preferably designed as a latching nose helps to secure the assembly, preventing the remaining positive-fit elements of the attachment section and locking unit from spontaneously detaching from each other.

Another especially advantageous embodiment of the invention provides that the actuation lever be sectionally provided with stiffening or reinforcing elements, which connect spaced-apart sections of the actuation lever by way of struts. It is here in particular provided that these stiffening or reinforcing elements be connected as a single piece with the actuation lever, and exhibit a flat, plate-like outer contour.

It is provided in particular that the stiffening and reinforcing elements are used to reinforce or structurally stiffen a curved section of the actuation lever. In particular, a flatly designed stiffening or reinforcing element can lie in the plane that is clamped by the sections of the actuation lever that are connected by a curvature. The step of attaching or connecting the stiffening or reinforcing elements to the actual actuation lever is preferably incorporated into the injection molding process for forming the lever, thus eliminating the need for a separate work or assembly step for this purpose.

According to another independent aspect, the embodiments of invention further relates to a longitudinal adjustment device of a motor vehicle seat with an actuation lever according to the invention. The embodiments of the invention further encompass a car seat provided with such a longitudinal adjustment device.

BRIEF DESCRIPTION OF THE DRAWINGS

The embodiments of present invention will hereinafter be described in conjunction with the following drawing figures, wherein like numerals denote like elements, and:

FIG. 1 is a perspective view of an actuation lever according to prior art;

FIG. 2 is a magnified perspective view of the attachment section of the actuation lever according to FIG. 1 connected with a locking unit;

DETAILED DESCRIPTION

The following detailed description is merely exemplary in nature and is not intended to limit application and uses. Furthermore, there is no intention to be bound by any theory presented in the preceding background or summary or the following detailed description.

Figure 3:
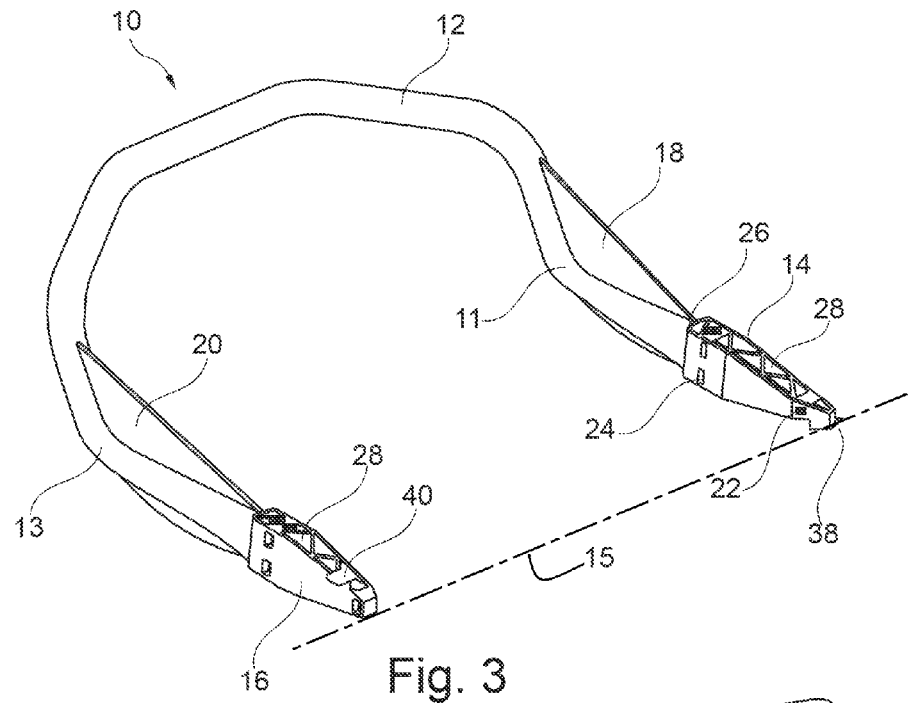
FIG. 3 is a perspective view of the actuation lever according to an embodiment of the invention in the form of an injection molded plastic part.
Figure 6:
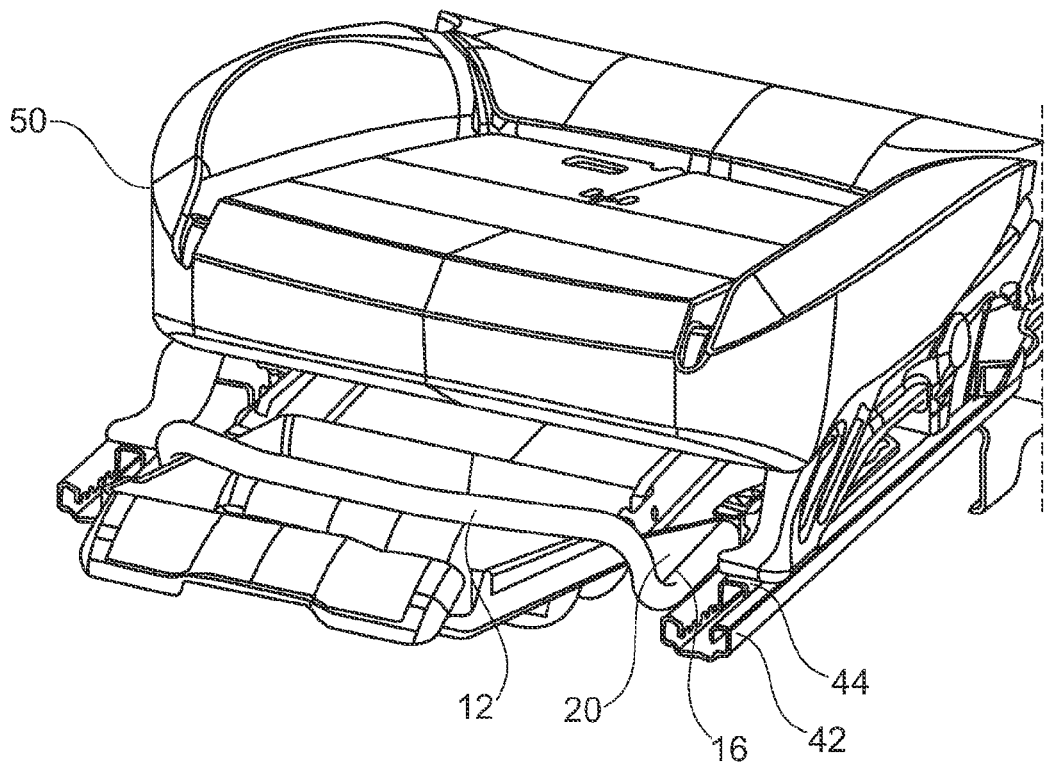
FIG. 6 is a perspective, sectional view of a car seat provided with the actuation lever according to an embodiment of the invention.
Figure 7:
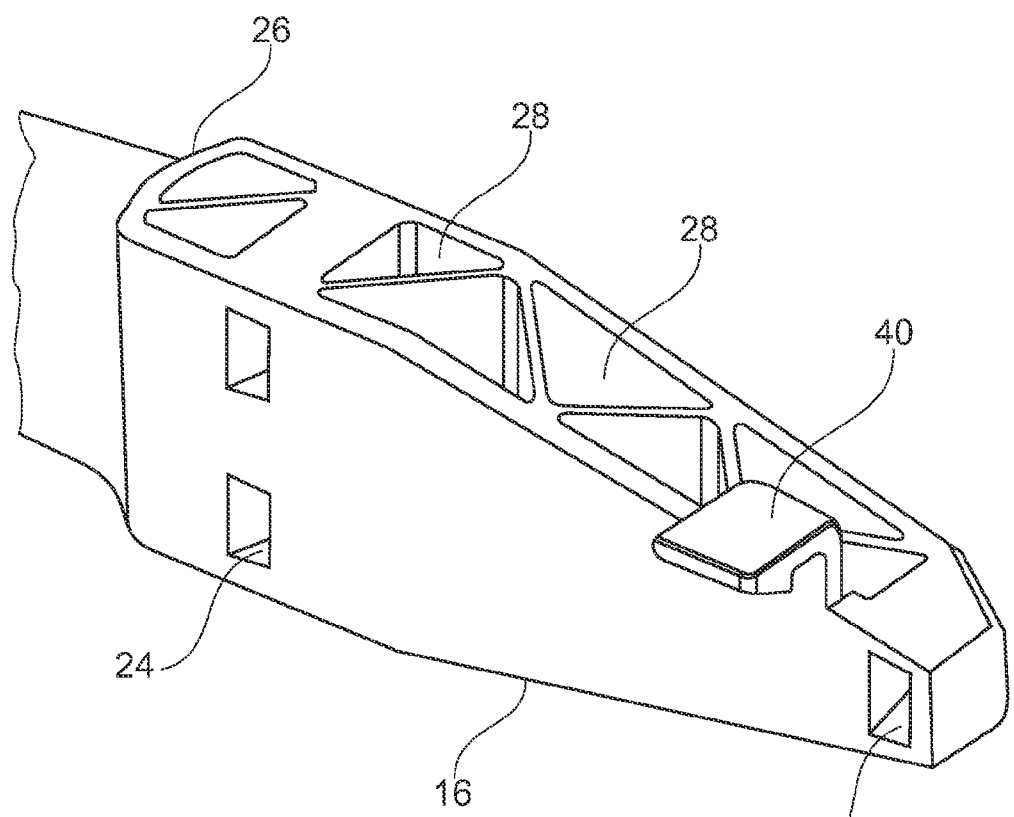
FIG. 7 is a magnified perspective view of the attachment section of the actuation lever.
Figure 8:
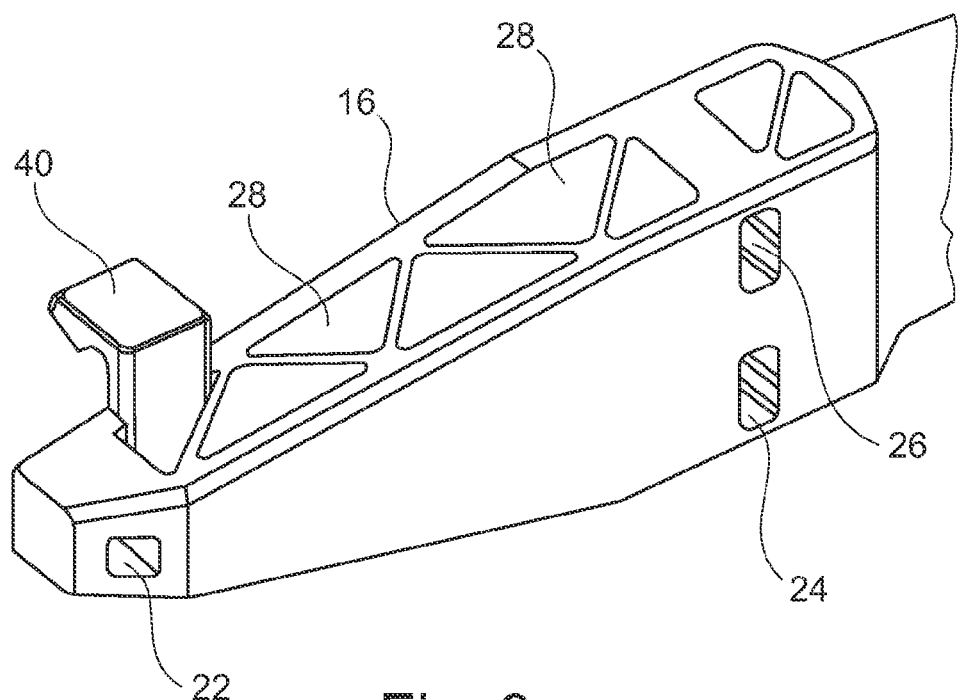
FIG. 8 is a further perspective view of the attachment section according to FIG. 7.

The actuation lever 10 according to an embodiment of the invention is shown in a perspective view on FIG. 3 and exhibits a gripping section 12 in its upper (see FIG. 3), central area lying to the front with the seat assembled as depicted on FIG. 6. The latter can be gripped by a user sitting in the vehicle seat 50, so that the lever as a whole executes a swiveling motion about axis 15, for example when pulling up on the gripping section 12. As a result, the locking unit 30 connectable with the lever 10 can be switched to a release position, in which the vehicle seat 50 can be manually adjusted in the longitudinal direction by mutually shifting the upper rail 44 and lower rail 42 relative to each other.

The actuation lever 10 shown on FIG. 3 is designed as a kind of bracket with lateral legs 11, 13, which connects the gripping part 12 running essentially in the transverse direction of the vehicle at least sectionally with the attachment sections 14, 16 provided at the free ends of the bracket.

In the embodiment shown, the actuation lever 10 is designed as a one-piece injection molded plastic part. In particular using the internal gas pressure injection molding process makes it possible to easily achieve complex shape in the area of the attachment sections 14, 16. The attachment section 14 positively connectable with the locking unit 30 exhibits a number of reinforcement ribs 28, which on FIGS. 4 and 5 form triangular hollow spaces when viewed from above.

These reinforcing or stiffening ribs 28 bring about a targeted, local increase in structural stiffness for the actuation lever 10, in particular so as to be able to deflect and transfer those forces arising near a swiveling axis of the lever, without subjecting the lever itself to a deformation. The swiveling axis can here be preset by the locking unit 30, for example by pivoting the locking unit 30 as such to the locking device of the upper and lower rails 44, 42 (not explicitly shown on the figures) so that it can swivel.

Figure 4:
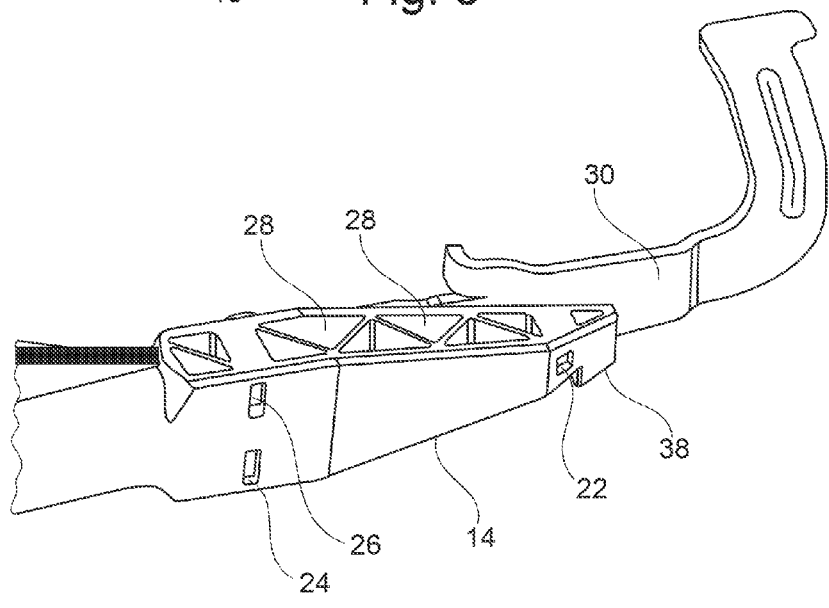
FIG. 4 is a magnified view of the attachment section of the actuation lever according to FIG. 3 connected with a locking unit.

The attachment section 14 shown magnified on FIG. 4 is further provided with several receptacles or through openings 22, 24, 26, which are used to positively secure the attachment section 14 to the locking unit 30. As depicted on FIG. 2, the locking unit 30 accommodates two inwardly projecting forked or pronged journals or attachment brackets 34, 36 on an end section facing the actuation lever 10.

Figure 5:
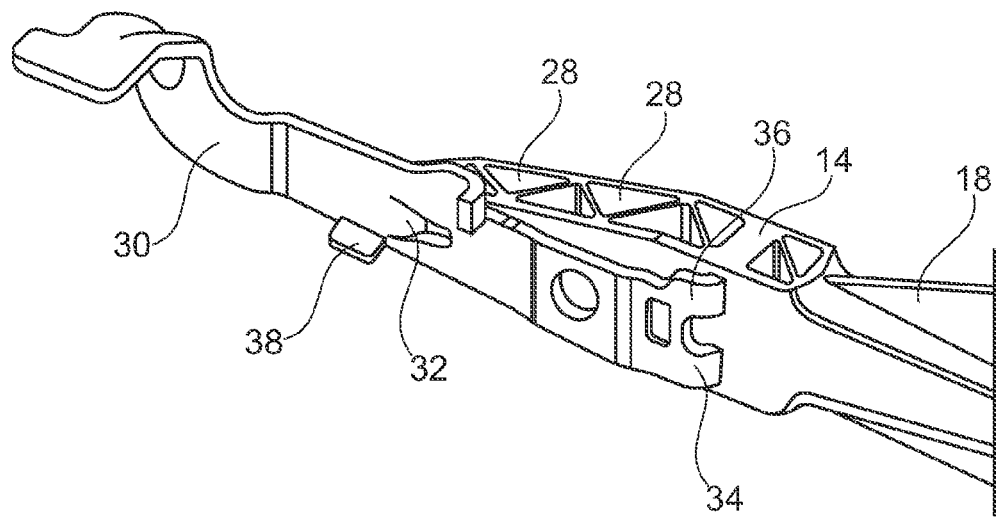
FIG. 5 is another perspective view of the attachment shown on FIG. 4.

The latter come to lie in the through openings or receptacles 24, 26 provided on the corresponding attachment section 14 while assembling the actuation lever 10. The receptacle 22 for holding a journal or bracket 32 essentially extending in the transverse direction of the vehicle and denoted by example on FIG. 5 is also provided in corresponding fashion. Because the mutually corresponding receptacles 22, 24, 26 and journals 32, 34, 36 are spaced apart from each other, in particular radially spaced apart from each other relative to the swiveling axis of the locking unit 30, an upwardly directed tensile force acting on the gripping section 12 is converted into a corresponding rotational or swiveling motion of the locking unit 30.

The locking unit 30 is nearly unchanged relative to the configuration as described in prior art, e.g., as shown on FIG. 2. In particular, this makes it possible to smoothly change out the metal brackets according to prior art, e.g., as shown on FIG. 1, for the plastic brackets depicted on FIG. 3 to 8, and integrate the latter into day-to-day vehicle production.

The free ends of the attachment sections 14, 16 each exhibit outwardly projecting latching elements, which are designed to overlap an edge section of the locking unit 30. To this end, the latching elements 38, 40 exhibit a stop incline and a latching groove lying behind that in the plug-on or slip-on direction, which is designed to reflect the material thickness of the locking unit, and provided to hold the locking unit 30, which is preferably designed as a sheet section.

This latching connection is used to prevent the attachment section 14, 16 from spontaneously detaching from the accompanying locking unit 30. The two latching elements 38, 40 form a positive fit acting at least in the transverse direction of the vehicle between the actuation lever 10 and the allocated locking unit of the locking device.

As depicted on FIG. 3, the latching elements 38, 40 (or projections) are arranged alternately on the upper and lower side of the attachment sections. While the latching element 38 arranged on the attachment section 14 envelops the allocated locking unit 30 from below, the latching element 40 arranged on the attachment section 16 is provided to envelop an allocated locking unit 30 (not explicitly shown on the figures) from above.

It can also be provided that both attachment sections 14, 16 are furnished with a respective upper and lower latching element or latching element 38, 40.

It is also conceivable to arrange one or more latching projections or elements 38, 40 on the upper or lower side of an attachment section.

The latching connection of the actuation lever 10 on the adjustment device can further be designed in such a way that the actuation lever 10 releases from the adjustment device without unlocking the seat in the process in response to a force that exceeds the prescribed threshold, for example in a vehicle collision.

In order to attach the bracket 32 designed as an injection molded plastic part to opposing locking units 30 of the car seat, it is provided that the outer lateral surfaces of the attachment sections 14, 16 come to abut the inner surfaces of allocated locking units 30. It can here be provided in particular that the distance between the opposing attachment sections 14, 16 of the actuation lever 10 be somewhat greater in the initial state, i.e., prior to assembly, than permitted by the clearance between the allocated locking units 30 of the locking device.

In this regard, it can be provided that the two opposing legs 11, 13 of the actuation lever 10 be moved at least slightly toward each other during assembly, so that the bracket-like, pre-stressed actuation lever 10 can be situated between locking units 30 opposing each other in the transverse direction of the vehicle. This outwardly directed pre-stressing of the actuation lever 10 counteracts a spontaneous detachment of the attachment sections 14, 16 of the actuation lever from the allocated locking units 30.

In addition, the plastic actuation lever 10 designed as an injection molded part shown on FIG. 3 exhibits structurally stiffening elements 18, 20 on its lateral legs 11, 13 that resemble flanges, e.g., are designed like a flashing. These stiffening or reinforcing elements 18, 20 are used for the targeted structural stiffening of the actuation lever 10, in particular in such leg sections 11, 13 provided with a curvature.

The two essentially straight sections of the legs 11, 13 that abut the bend located in the middle of the legs 11, 13 or the curvature provided there are connected by way of a strut by means of the flat and plate-like stiffening and reinforcing elements 18, 20. As a result, the forces to be transferred upon actuation of the lever can be reliably conveyed to the two attachment sections 13, 16 and introduced into the adjustment and locking device, while circumventing an extraordinarily high material load on the gripping section 12.

The two stiffening or reinforcing elements 18, 20 are preferably attached in the injection molding process provided to form and shape the actuation lever 10, thereby eliminating the need to subsequently stiffen the finished injection molded part.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An actuation lever for a longitudinal adjustment device of a car seat, comprising:
    a gripping section; and
    an attachment section for mechanically coupling the actuation lever with a locking unit of the longitudinal adjustment device,
    wherein at least one of the attachment section and the gripping section is at least partially an injection molded plastic part, and wherein the attachment section comprises a reinforcing rib that runs inclined to a longitudinal extension of the attachment section and forms a part of a multi-sided hollow section, wherein the hollow section extends essentially parallel to a swiveling motion of the actuation lever, and
    wherein the attachment section comprises at least two positive-fit elements spaced radially apart relative to a swiveling axis, which in an assembled state on the longitudinal adjustment device that interacts with corresponding positive-fit elements of the locking unit to form a positive connection between the actuation lever and the longitudinal adjustment device.

2. The actuation lever according to claim 1, wherein the gripping section and the attachment section are both at least partially the injection molded plastic part.

3. The actuation lever according to claim 1, wherein the actuation lever is a one-piece injection molded plastic part.

4. The actuation lever according to claim 2, wherein the injection molded plastic part is fabricated with an internal gas pressure injection molding process.

5. The actuation lever according to claim 1, wherein at least the gripping section is designed with a hollow profile in cross section.

6. The actuation lever according to claim 1, wherein at least the attachment section comprises a fiber-reinforced plastic.

7. The actuation lever according to claim 1, wherein the attachment section comprises at least one latching element that in an assembled state at least sectionally grips the locking unit.

8. The actuation lever according to claim 1, wherein the actuation lever is sectionally provided with a reinforcement element that connects spaced apart sections of the actuation lever by way of a strut.

9. An actuation lever for a longitudinal adjustment device of a car seat, comprising:
    a gripping section; and
    an attachment section for mechanically coupling the actuation lever with a locking unit of the longitudinal adjustment device,
    wherein the attachment section comprises a reinforcing rib that runs inclined to a longitudinal extension of the attachment section and forms a part of a multi-sided hollow section,
    wherein the attachment section comprises at least one latching element that in an assembled state at least sectionally grips the locking unit and at least two positive-fit elements spaced radially apart relative to a swiveling axis, which in an assembled state on the longitudinal adjustment device that interacts with corresponding positive-fit elements of the locking unit to form a positive connection between the actuation lever and the longitudinal adjustment device, and
    wherein the gripping section and the attachment section are at least partially the injection molded plastic part.

10. The actuation lever according to claim 9, wherein the actuation lever is a one-piece injection molded plastic part.

11. The actuation lever according to claim 9, wherein at least the attachment section comprises a fiber-reinforced plastic.

12. The actuation lever according to claim 9, wherein the actuation lever is sectionally provided with a reinforcement element that connects spaced apart sections of the actuation lever by way of a strut.

13. An actuation lever for a longitudinal adjustment device of a car seat, comprising:
    a gripping section; and
    an attachment section for mechanically coupling the actuation lever with a locking unit of the longitudinal adjustment device,
    wherein at least one of the attachment section and the gripping section is at least partially an injection molded plastic part, and wherein the attachment section comprises a reinforcing rib that runs inclined to a longitudinal extension of the attachment section and forms a part of a multi-sided hollow section, wherein the hollow section extends essentially parallel to a swiveling motion of the actuation lever, and
    wherein the actuation lever is sectionally provided with a reinforcement element that connects spaced apart sections of the actuation lever by way of a strut.

14. The actuation lever according to claim 13, wherein the gripping section and the attachment section are both at least partially the injection molded plastic part.

15. The actuation lever according to claim 13, wherein at least the gripping section is designed with a hollow profile in cross section.

16. The actuation lever according to claim 13, wherein the attachment section comprises at least one latching element that in an assembled state at least sectionally grips the locking unit.

17. The actuation lever according to claim 13, wherein the reinforcement element is connected as one piece with the actuation lever, and comprises a flat, plate-like outer contour.

* * * * *